US008952640B2

(12) United States Patent
Lim et al.

(10) Patent No.: US 8,952,640 B2
(45) Date of Patent: Feb. 10, 2015

(54) APPARATUS AND METHOD FOR CONTROLLING ACTUATOR

(75) Inventors: Seong-Taek Lim, Suwon-si (KR); Jong-Sun Ko, Yongin-si (KR); Jin-Woo Cho, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 145 days.

(21) Appl. No.: 13/397,085

(22) Filed: Feb. 15, 2012

(65) Prior Publication Data

US 2013/0038266 A1 Feb. 14, 2013

(30) Foreign Application Priority Data

Aug. 10, 2011 (KR) .................. 10-2011-0079797

(51) Int. Cl.
*H02P 6/12* (2006.01)
*G05B 13/04* (2006.01)

(52) U.S. Cl.
CPC ...... *G05B 13/04* (2013.01); *G05B 2219/41369* (2013.01); *G05B 2219/41378* (2013.01); *G05B 2219/41382* (2013.01); *G05B 2219/41388* (2013.01); *G05B 2219/42044* (2013.01)
USPC ........... 318/400.15; 318/400.02; 318/400.01; 318/77; 318/76

(58) Field of Classification Search
USPC ...................... 318/400.15, 400.02, 400.01, 77
See application file for complete search history.

(56) References Cited

U.S. PATENT DOCUMENTS

2010/0060226 A1* 3/2010 Ide ............................... 318/611
2011/0029171 A1 2/2011 Hyde et al.

FOREIGN PATENT DOCUMENTS

KR 20030075446 A 9/2003

* cited by examiner

*Primary Examiner* — Eduardo Colon Santana
*Assistant Examiner* — Iftekhar Mustafa
(74) *Attorney, Agent, or Firm* — Sughrue Mion, PLLC

(57) ABSTRACT

Provided is an actuator control apparatus including: an observer configured to estimate a state of a load based on a state equation including at least one modeled load parameter; a controller which outputs a signal for controlling the load; a compensation unit which compensates for the signal output from the controller; and an estimator configured to estimate a change of a load parameter, to decide a gain of the compensation unit based on the estimated change of the load parameter, and to update the modeled load parameter.

14 Claims, 5 Drawing Sheets

APPARATUS AND METHOD FOR CONTROLLING ACTUATOR

CROSS-REFERENCE TO RELATED APPLICATION

This application claims priority from Korean Patent Application No. 10-2011-0079797, filed on Aug. 10, 2011, in the Korean Intellectual Property Office, the entire disclosure of which is incorporated herein by reference.

BACKGROUND

1. Field

Apparatuses and methods consistent with exemplary embodiments relate to a technique for controlling an actuator such as a rotary motor.

2. Description of the Related Art

In general, speed control has been conducted by a proportional-integral (PI) controller that can be relatively easily implemented. However, the PI controller does not provide high performance when used in a tracking controller.

In order to solve the problem, a method of using a tracking controller to feed back state variables using output errors has been developed and widely used. Since the method obtains gains based on an optimal control theory, it is more effective than a trial and error method of a general PI controller.

Meanwhile, studies into an observer capable of detecting inputs whose actual values cannot be easily recognized or found have been conducted to be used as a disturbance observer, a fuzzy logic controller, and a controller using static gains. However, for more precise control in speed and position, a problem where there occur differences between parameters of the observer and parameters of a real system should be solved. In order to solve the problem, studies into a method for using a VSS and a fuzzy logic have been conducted. However, there are still difficulties in completely removing fine vibrations since the method is focused on high rigidity control.

Particularly, in the case of an electrical vehicle, parameters about the motor change depending on an environment and conditions under which the motor operates, and changes of the parameters make a desired control difficult and have an inverse influence on stable operations.

SUMMARY

According to an aspect of an exemplary embodiment, there is provided an actuator control apparatus including: an observer configured to estimate a state of a load based on a state equation including at least one modeled load parameter; a controller which outputs a signal for controlling the load; a compensation unit which compensates for the signal output from the controller; and an estimator configured to estimate a change of a load parameter, to decide a gain of the compensation unit based on the estimated change of the load parameter, and to update the modeled load parameter.

According to another aspect of an exemplary embodiment, there is provided an actuator control apparatus including: a speed observer configured to estimate a speed of a load based on a first state equation including at least one modeled load parameter; a torque observer configured to estimate a torque of the load based on a second state equation including the modeled load parameter; a speed controller configured to output a first signal for controlling the speed of the load; a neural network unit which learns an output of the torque observer and outputs a second signal that is to be added to the first signal; a parameter compensation unit which receives a third signal which is a sum of the first signal and the second signal and compensates for the third signal, thus outputting a final control signal; and a parameter estimator configured to estimate a change of a load parameter, to decide a gain of the parameter compensation unit based on the estimated change of the load parameter, and to update the modeled load parameter of the speed observer and the torque observer.

According to another aspect of an exemplary embodiment, there is provided an actuator control apparatus including: a speed observer configured to estimate a speed and a position of a load based on a first state equation including at least one modeled load parameter; a torque observer configured to estimate a torque of the load based on a second state equation including the modeled load parameter; a position controller which outputs a first signal for controlling the position of the load; a neural network unit which learns an output of the torque observer and outputs a second signal that is to be added to the first signal; a parameter compensation unit which receives a third signal obtained by adding the first signal to the second signal and compensates for the third signal, thus outputting a final control signal; and a parameter estimator configured to estimate a change of a load parameter, to decide a gain of the parameter compensation unit based on the estimated change of the load parameter, and to update the modeled load parameter of the speed observer and the torque observer.

According to another aspect of an exemplary embodiment, there is provided an actuator control apparatus including: a speed observer configured to estimate a speed and a position of a load based on a first state equation including at least one modeled load parameter; a torque observer configured to estimate a torque of the load based on a second state equation including the modeled load parameter; a neural network unit which learns an output of the torque observer and outputs a load torque compensation value that is to be added to a torque command; a torque controller which receives a value obtained by adding the torque command to the load torque compensation value and outputs a signal for controlling the torque of the load; a parameter compensation unit which compensates for the signal output from the torque controller and outputs a final control signal; and a parameter estimator configured to estimate a change of a load parameter, to decide a gain of the parameter compensation unit based on the estimated change of the modeled load parameter, and to update the modeled load parameter of the torque controller, the speed observer, and the torque observer.

According to another aspect of an exemplary embodiment, there is provided an actuator control method including: estimating a state of a load based on a state equation including at least one modeled load parameter; outputting a control signal for controlling the load; compensating for the control signal; and estimating a change of a load parameter, deciding a degree of compensation of the control signal based on the estimated change of the load parameter, and updating the modeled load parameter.

Other features and aspects will be apparent from the following detailed description, the drawings, and the claims.

BRIEF DESCRIPTION OF THE DRAWINGS

The above and/or other aspects will become more apparent by describing certain exemplary embodiments with reference to the accompanying drawings, in which.

Figure 1:
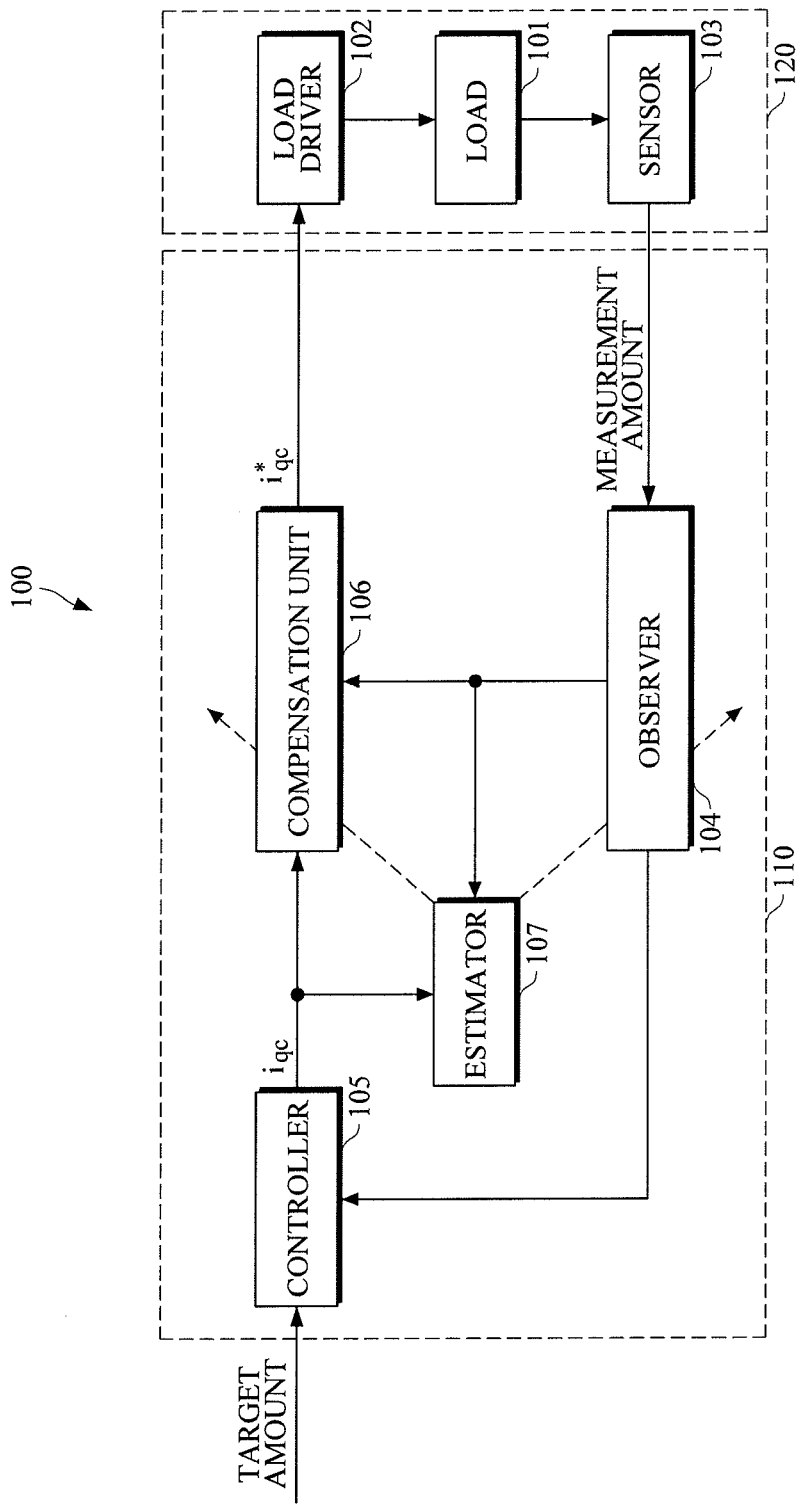
FIG. 1 is a diagram illustrating an exemplary embodiment of an actuator system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an exemplary embodiment of an actuator system 100.

The actuator system 100 illustrated in FIG. 1 may be used with a motor control system of an electric vehicle for providing a smoother ride. Also, the actuator system 100 may be used with automated machines using an X-Y table, position control systems for robots, systems for seek time reduction of CD-ROM drivers, industrial automated machines, zoom-in/zoom-out systems for camcorders, and so on.

Referring to FIG. 1, the actuator system 100 may include a control part 110 and a load part 120. The load part 120 may be an actuator module that is actually driven, and the control part 110 may be a controller for controlling the actuator module.

The load part 120 may include a load 101, a load driver 102, and a sensor 103. The load 101 may be a rotary motor. The load driver 102 transfers a driving force to the load 101 in response to a control signal $i^*_{qc}$ from the control part 110. The sensor 103 detects the output of the load 101. The sensor 103 senses the position or speed, etc. of the load 101, and provides the results of the sensing to the control part 110. For example, the sensor 103 may be an encoder or a resolver, or a counter for counting the results of measurements by the encoder or resolver. It is noted that at least one of the elements of the load part 120 may be implemented as a hardware component.

The control part 110 may include an observer 104, a controller 105, a compensation unit 106, and an estimator 107. The observer 104 estimates a state of the load 101 in a state space. In another exemplary embodiment, the observer 104 may be an observation unit. For example, the observer 104 solves a state equation including parameters of a modeled load 101 to estimate a state of the load 101. The estimated state of the load 101 may be a speed, position or torque of the load 101. The result of the measurement by the observer 104 is provided to the controller 105, the compensation unit 106, and the estimator 107. The controller 105 may be a state feedback controller. The controller 105 outputs a control signal $i_{qc}$ based on a target amount of control and the output from the observer 104. The control signal $i_{qc}$ is input to the compensation unit 106, and the compensation unit 106 compensates for the control signal $i_{qc}$ and outputs a final control signal $i^*_{qc}$. The estimator 107 estimates any change in load parameters and decides a gain of the compensation unit 106 based on the estimated change of the parameters. Also, the estimator 107 updates modeled load parameters included in the state equation of the observer 104 based on estimated parameters. According to an aspect, parameters for the state equation may be referred to as modeled parameters, and parameters estimated by the estimator 107 may be referred to as observed parameters. It is noted that at least one of the elements of the control part 110 may be implemented as a hardware component. In another exemplary embodiment, all elements of the control part 110 are implemented in hardware.

The controller 105 may include at least one of a position controller for controlling the position of the load 101, a speed controller for controlling the speed of the load 101, and a torque controller for controlling the torque of the load 101.

The observer 104 may include at least one of a speed observer for estimating the speed or position of the load 101 to output speed compensation information or position compensation information and a torque observer for estimating the torque of the load 101 to output torque compensation information. In another exemplary embodiment, the speed and the torque observers may be a speed observation unit and a torque observation unit.

The estimator 107 may estimate changes of load parameters through a Recursive Least Square Method (RLSM) based on the outputs of the observer 104 and the controller 105.

As such, instead of using only measurement values from a sensor, since information about the speed, position or torque of a load, which is estimated in a state space, is provided to a state feedback controller, that is, to the controller 105, control precision on speed, position or torque may be improved. Also, since the changed parameters obtained in the state space are reflected to model parameters that are used by the observer 104, the control precision may be further improved.

Figure 2:
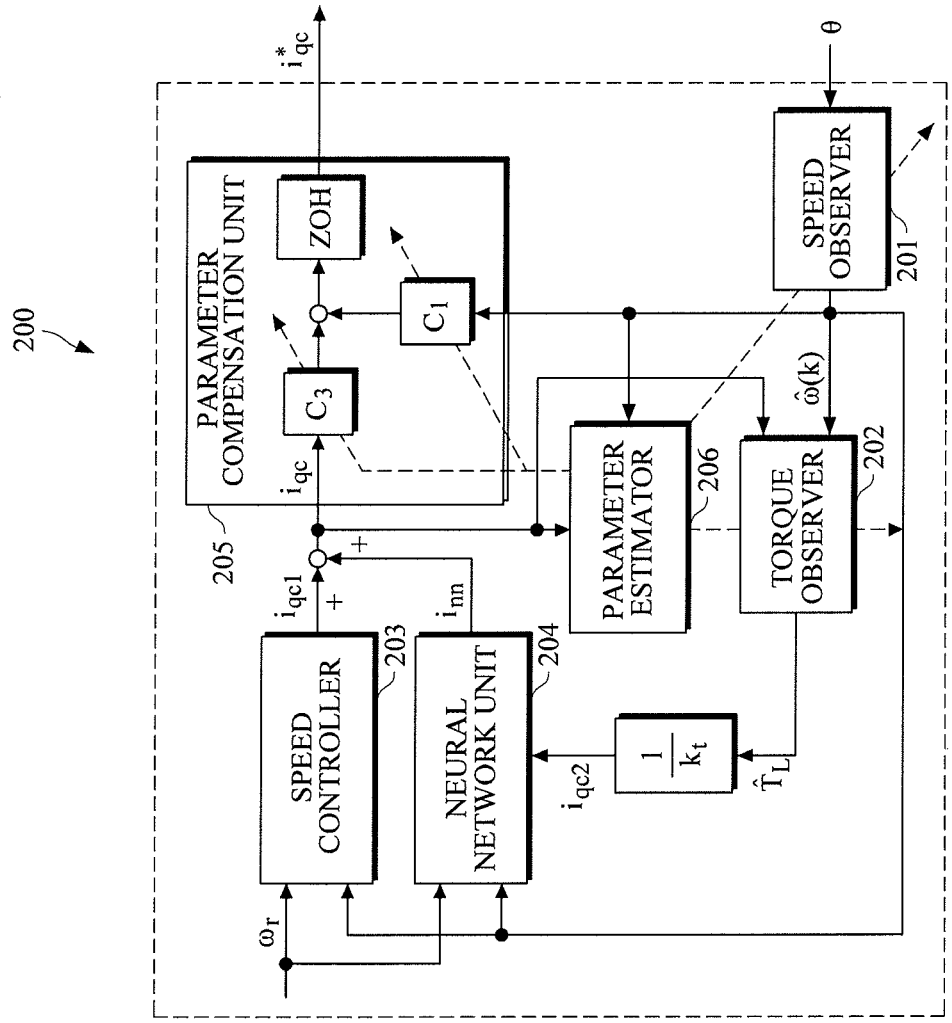
FIG. 2 is a diagram illustrating an exemplary embodiment of an actuator control apparatus.

FIG. 2 is a diagram illustrating an exemplary embodiment of an actuator control apparatus 200.

The actuator control apparatus 200 may be applied to a cruise controller for allowing a vehicle to drive at a constant speed without being influenced by changes in load, such as road gradients, live load, etc.

Referring to FIG. 2, the actuator control apparatus 200 includes a speed observer 201, a torque observer 202, a speed controller 203, a neural network unit 204, a parameter compensation unit 205, and a parameter estimator 206.

The speed observer 201 estimates the speed of a load based on a first state equation including modeled load parameters. For example, the speed observer 201 may estimate the speed $\omega$ and position $\theta$ of a motor according to a state equation (1) below.

$$\begin{bmatrix} \hat{\omega}_r \\ \hat{\theta} \\ \hat{z}_\omega \end{bmatrix} = \begin{bmatrix} -\frac{B}{J} & 0 & 0 \\ 1 & 0 & 0 \\ 0 & 1 & 0 \end{bmatrix} \begin{bmatrix} \omega_r \\ \theta \\ z_\omega \end{bmatrix} + \begin{bmatrix} k_t \frac{P}{2}\frac{1}{J} \\ 0 \\ 0 \end{bmatrix} i_{qs} - \begin{bmatrix} 0 \\ 0 \\ 1 \end{bmatrix}\theta, \quad (1)$$

where z represents an integral value of an error between the estimated position $\theta$ and a real position, $i_{qs}$ represents a state feedback control input, and B, J, $k_t$, and p represent parameters about the motor, wherein B may be a coefficient of friction, J may be a coefficient of inertia, $k_t$ may be a torque constant, and p may be the number of pole.

In this way, the speed observer 201 estimates the speed of a load based on a state equation including parameters modeled for the load. The estimated speed of the load may be referred to as speed compensation information.

In the exemplary embodiment, information about the speed of the load may be, instead of a differential value of position information of the load, the result of calculation in a state space by the speed observer 201. In other words, by interworking the result of calculation in the state space by the speed observer 201 with the torque observer 202, the parameter estimator 206, and the parameter compensation unit 205 in order to control a load using speed information of the load, more stable control on the load is achieved.

The torque observer 202 estimates the torque of the load based on a second state equation including modeled load parameters. For example, the torque observer 202 may estimate the torque $T_L$ of the motor according to a state equation 2 below.

$$\begin{bmatrix} \dot{\omega} \\ \dot{\theta} \\ \dot{\hat{T}}_L \end{bmatrix} = \begin{bmatrix} -\frac{B}{J} & 0 & -\frac{p}{2J} \\ 1 & 0 & 0 \\ 0 & 0 & 0 \end{bmatrix} \begin{bmatrix} \hat{\omega} \\ \hat{\theta} \\ \hat{T}_L \end{bmatrix} + \begin{bmatrix} k_t \frac{P}{2J} \\ 0 \\ 0 \end{bmatrix} i_{qs} + L \left( \theta - \begin{bmatrix} 0 & 1 & 0 \end{bmatrix} \begin{bmatrix} \hat{\omega} \\ \hat{\theta} \\ \hat{T}_L \end{bmatrix} \right), \quad (2)$$

where $i_{qs}$ represents a stator current of the motor, B, J, $k_t$, and p represent parameters about the motor, wherein B may be a coefficient of friction, J may be a coefficient of inertia, $k_t$ may be a torque constant, and p may be the number of pole, and L represents a gain vector of the torque observer 202.

As such, the torque observer 202 estimates the torque of a load based on a state equation including modeled load parameters, and the estimated torque of the load may be referred to as torque compensation information. The torque observer 202 may be a deadbeat type disturbance observer.

The speed controller 203 compares a real amount of measurement to a target amount of control and outputs a predetermined control signal $i_{qc1}$ according to the result of the comparison. Here, the real amount of measurement may be based on the result of the estimation by the speed observer 201.

The neural network unit 204 learns the output of the torque observer 202 to generate an output $i_{nn}$ that is to be added to the control signal $i_{qc1}$. For example, the neural network unit 204 receives an estimation speed estimated by the speed observer 201, a target speed, a difference between the estimation speed and the target speed, and an equivalent current $i_{qc2}$ obtained by performing scalar multiplication on the output of the torque observer 202, and applies a back propagation algorithm on the received values to generate the output $i_{nn}$ against disturbance.

The parameter compensation unit 205 receives a control signal $i_{qc}$ which is a sum of the output $i_{qc1}$ of the speed controller 203 and the output $i_{nn}$ of the neural network unit 204, and compensates for the control signal $i_{qc}$, thereby outputting a final control signal $i^*_{qc}$. For example, the parameter compensation unit 205 may convert the control signal $i_{qc}$ according to equation 3 below.

$$i^*_{qc}(k) = C_1(k) \cdot \omega(k) + C_2(k) \cdot \theta(k) + C_3(k) \cdot i_{qc}(k), \quad (3)$$

where $C_1$, $C_2$, and $C_3$ respectively represent gains of compensators included in the parameter compensation unit 205. In FIG. 2, $C_1$ and $C_3$ also denote the individual compensators included in the parameter compensation unit 205, and $C_2$ is not shown.

According to an exemplary embodiment, the parameter compensation unit 205 may be configured to include a compensator $C_3$ for increasing or decreasing the control signal $i_{qc}$ which is a sum of the output $i_{qc1}$ of the speed controller 203 and the output $i_{nn}$ of the neural network unit 204, a compensator $C_1$ for increasing or decreasing speed compensation information which is the output of the speed observer 201, and an adder for adding the output of the compensator $C_3$ to the output of the compensator $C_1$.

The parameter estimator 206 estimates changes of load parameters. For example, the parameter estimator 206 may estimate changes of load parameters through the RLSM.

Also, the parameter estimator 206 may decide gains of the individual compensators of the parameter compensation unit 205 based on the estimated changes of the load parameters, according to equation 4 below.

$$C_1 = \frac{(\alpha_n - \alpha)}{\gamma}, \quad C_2 = \frac{(\beta_n - \beta)}{\gamma}, \quad C_3 = \frac{\gamma_n}{\gamma}, \quad (4)$$

where α, β, and γ represent the estimated parameters and $\alpha_n$, $\beta_n$, and $\gamma_n$ represent nominal load parameters. For example, in equations 1 and 4, α relates to −(B/J) term and γ relates to $k_t(p/2J)$ term.

Also, the parameter estimator 206 may update the modeled load parameters included in the state equation of the speed observer 201, based on the estimated changes of the load parameters. For example, the parameter estimator 206 may update B, J, and $k_t$ in equations 1 and 2.

Figure 3:
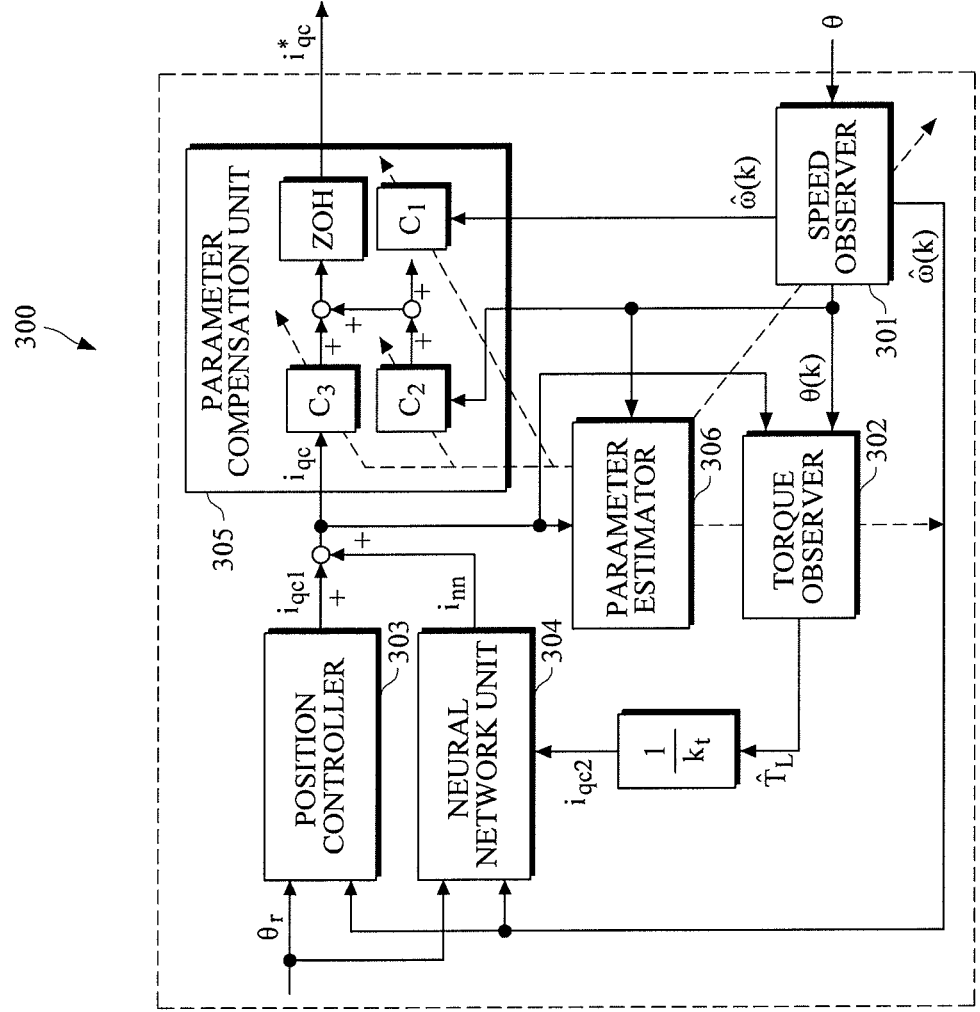
FIG. 3 is a diagram illustrating another exemplary embodiment of an actuator control apparatus.

FIG. 3 is a diagram illustrating another exemplary embodiment of an actuator control apparatus 300. The actuator control apparatus 300 may be used with a position controller for preventing a vehicle from sliding or rolling upon starting on a sloped load.

Referring to FIG. 3, the actuator control apparatus 300 may include a speed observer 301, a torque observer 302, a position controller 303, a neural network unit 304, a parameter compensation unit 305, and a parameter estimator 306.

The speed observer 301 estimates the speed and position of a load based on a first state equation including modeled load parameters. For example, the speed observer 301 may estimate the speed w and position θ of a motor according to equation 1 as expressed above.

The torque observer 302 estimates the torque of the load according to a second state equation including modeled load parameters. For example, the torque observer 302 may estimate the torque $T_L$ of a motor according to equation 2 as expressed above.

The position controller 303 may compare a real amount of measurement to a target amount of control to output a predetermined control signal $i_{qc1}$. The real amount of measurement may be based on the result of estimation by the speed observer 201 or the result of sensing by a sensor.

The neural network unit 304 learns the output of the torque observer 302 and outputs an output $I_{nn}$ that is to be added to the control signal $i_{qc1}$. For example, the neural network unit 304 receives an estimation speed estimated by the speed observer 301, a target speed, a difference between the estimation speed and the target speed, and an equivalent current $i_{qc2}$ obtained by performing scalar multiplication on the output of the torque observer 302, and applies a back propagation algorithm on the received values to generate the output $i_{nn}$ against disturbance.

The parameter compensation unit 305 receives a control signal $i_{qc}$ which is a sum of the output $i_{qc1}$ of the position controller 303 and the output $i_{nn}$ of the neural network unit 304, and compensates for the control signal $i_{qc}$, thereby outputting a final control signal $i^*_{qc}$. For example, the parameter compensation unit 305 may convert the control signal $i_{qc}$ according to equation 3 as expressed above.

According to an exemplary embodiment, the parameter compensation unit 305 may be configured to include a compensator $C_3$ for increasing or decreasing the control signal $i_{qc}$ which is a sum of the output $i_{qc1}$ of the position controller 303 and the output $i_{nn}$ of the neural network unit 304, a compensator $C_2$ for increasing or decreasing position compensation information among the output of the speed observer 301, a compensator $C_1$ for increasing or decreasing speed compensation information which is the output of the speed observer 301, a first adder for adding the output of the compensator $C_2$ to the output of the compensator $C_1$, and a second adder for adding the output of the first adder to the output of the compensator $C_3$.

The parameter estimator 306 estimates changes of the load parameters. Also, the parameter estimator 306 may decide gains of the compensators C1, C2, and C3 included in the parameter compensation unit 305 based on the estimated changes of the load parameters, according to equation 4 as expressed above. Furthermore, the parameter estimator 306 may update the modeled load parameters included in a state equation of the speed observer 301, based on the estimated changes of the load parameters.

Figure 4:
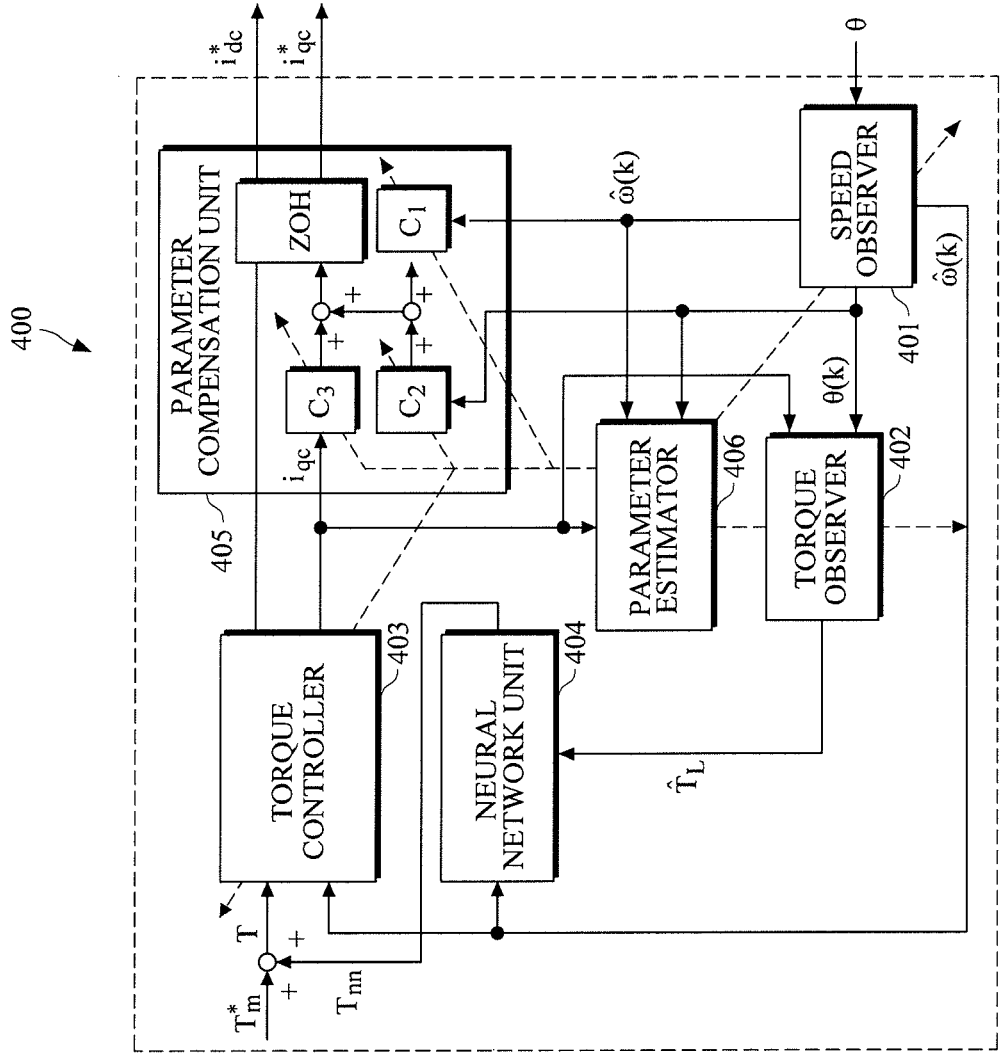
FIG. 4 is a diagram illustrating another exemplary embodiment of an actuator control apparatus.

FIG. 4 is a diagram illustrating another exemplary embodiment of an actuator control apparatus 400. The actuator control apparatus 400 may be used with a torque controller for controlling a torque generated according to a rotation angle of an accelerator for a vehicle.

Referring to FIG. 4, the actuator control apparatus 400 may include a speed observer 401, a torque observer 402, a torque controller 403, a neural network unit 404, a parameter compensation unit 405, and a parameter estimator 406.

The speed observer 401 estimates the speed and position of a load based on a first state equation including modeled load parameters. For example, the speed observer 401 may estimate the speed ω and position θ of a motor according to the state equation (1) as expressed above.

The torque observer 402 estimates the torque of the load based on a second state equation including modeled load parameters. For example, the torque observer 402 may estimate the torque $T_L$ of the motor according to the state equation 2 as expressed above.

The neural network unit 404 learns the output of the torque observer 402 to generate an output $T_{nn}$ that is to be added to a torque command $T^*_m$. For example, the neural network unit 404 receives an estimation speed estimated by the speed observer 401, a target speed, a difference between the estimation speed and the target speed, and the output of the torque observer 402, and applies a back propagation algorithm on the received values to generate the output $T_{nn}$ against disturbance.

The torque controller 403 receives a sum of the torque command $T^*_m$ and the output $T_{nn}$ of the neural network unit 404 and outputs a control signal $i_{qc}$.

The parameter compensation unit 405 compensates for the control signal $i_{qc}$ and outputs a final control signal $i^*_{qc}$. For example, the parameter compensation unit 405 may convert the control signal $i_{qc}$ according to equation 3 as expressed above. Like the configuration illustrated in FIG. 3, the parameter compensation unit 405 may include several compensators and several adders.

The parameter estimator 406 estimates changes of load parameters. Also, the parameter estimator 406 may decide gains of individual compensators included in the parameter compensation unit 405 based on the estimated changes of the load parameters, according to equation 4 as expressed above.

Furthermore, the parameter estimation unit 406 may update modeled load parameters included in the state equation of the speed observer 401 based on the estimated changes of the load parameters.

Figure 5:
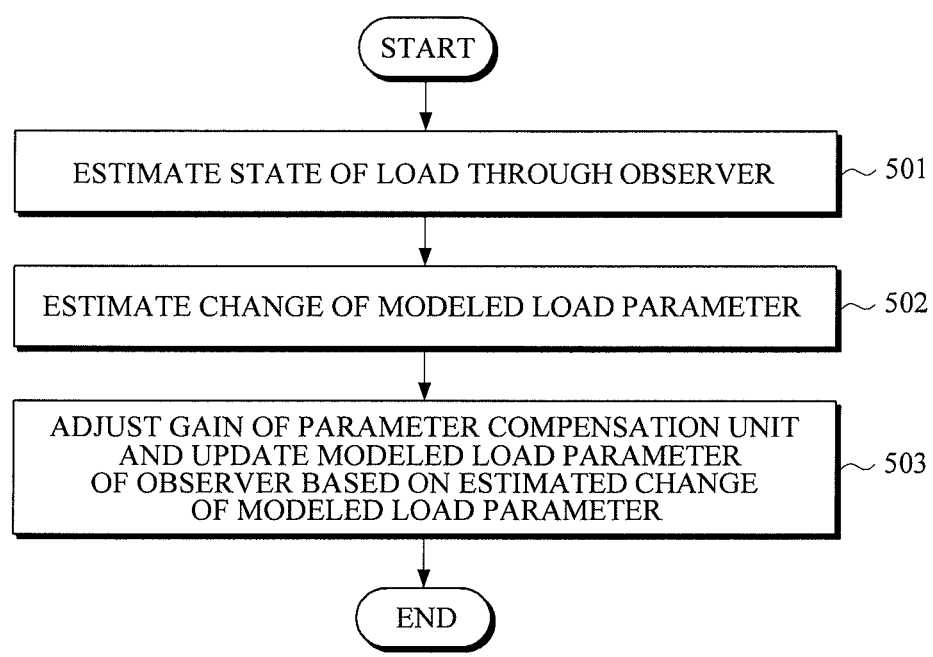
FIG. 5 is a flowchart illustrating an exemplary embodiment of an actuator control method.

FIG. 5 is a flowchart illustrating an exemplary embodiment of an actuator control method.

Referring to FIGS. 1 and 5, the actuator control apparatus 100 estimates a state of a load through an observer 104 (501). For example, the observer 104 solves a state equation including parameters of a load such as a motor, thereby obtaining estimation values of the speed, position or torque of the load.

Then, the actuator control apparatus 100 estimates changes of the load parameters (502). For example, the estimator 107 may estimate changes of the load parameters based on the output signal of the controller 105 and the result of measurement by the observer 104, through the RLSM.

When there are any changes of the load parameters, the actuator control apparatus 100 adjusts a gain of the parameter compensation unit and updates modeled load parameters from the observer 104 based on the estimated changes of the load parameters (503).

Therefore, according to the exemplary embodiments described above, since a speed of a load is calculated based on the result of measurement by the speed observer that is driven under optimal control, instead of using differential values with respect to the position of the load, parameters can be more precisely compensated. Furthermore, since the compensation results of the parameters are provided to the speed observer and the torque observer, control precision may be improved.

The aspects of the exemplary embodiments can be implemented as computer readable codes in a non-transitory computer readable record medium. The non-transitory computer readable record medium includes all types of record media in which computer readable data are stored. Examples of the non-transitory computer readable record medium include a ROM, a RAM, a CD-ROM, a magnetic tape, a floppy disk, and an optical data storage. Further, the non-transitory computer record medium may be implemented in the form of a carrier wave such as Internet transmission. In addition, the non-transitory computer readable record medium may be distributed to computer systems over a network, in which computer readable codes may be stored and executed in a distributed manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An actuator control apparatus comprising:
an observation unit configured to estimate a state of a load based on an equation including at least one modeled load parameter;
a controller which outputs a signal for controlling the load;
a compensation unit configured to compensate for the signal output from the controller comprising:
a first compensator configured to increase or decrease an output signal of the controller;
a second compensator configured to increase or decrease position compensation information;
a third compensator configured to increase or decrease speed compensation information; and an adder which adds an output of the second compensator to an output of the third compensator and adds a result of an addition to an output of the first compensator, thus outputting a final control signal; and
an estimator configured to estimate a change of a load parameter, to decide a gain of the compensation unit based on the estimated change of the load parameter, and to update the modeled load parameter based on the estimated change of the load parameter.

2. The actuator control apparatus of claim 1, wherein the controller comprises at least one among a position controller which controls a position of the load, a speed controller which controls a speed of the load, and a torque controller which controls a torque of the load.

3. The actuator control apparatus of claim 1, wherein the observation unit comprises at least one of a speed observation unit configured to estimate a speed of the load and a torque observation unit configured to estimate a torque of the load.

4. The actuator control apparatus of claim 1, wherein the estimator estimates the change of the load parameter using an output of the observation unit and an output of the controller.

5. An actuator control apparatus comprising:
a speed observation unit configured to estimate a speed of a load based on a first state equation including at least one modeled load parameter;
a torque observation unit configured to estimate a torque of the load based on a second state equation including the modeled load parameter;
a speed controller which outputs a first signal for controlling the speed of the load;
a neural network unit configured to determine an output of the torque observation unit and outputs a second signal that is to be added to the first signal;
a parameter compensation unit configured to receive a third signal which is a sum of the first signal and the second signal and compensates for the third signal, thus outputting a final control signal comprising:
a first compensator configured to increase or decrease the third signal;
a second compensator configured to increase or decrease position compensation information;
a third compensator configured to increase or decrease speed compensation information; and
an adder which adds an output of the second compensator to an output of the third compensator and adds a result of an addition to an output of the first compensator, thus outputting the final control signal; and
a parameter estimator configured to estimate a change of a load parameter, to decide a gain of the parameter compensation unit based on the estimated change of the load parameter, and to update the modeled load parameter of the speed observation unit and the torque observation unit based on the estimated change of the load parameter.

6. The actuator control apparatus of claim 5, wherein the speed observation unit outputs the speed compensation information corresponding to the estimated speed of the load, and the speed compensation information is provided to the torque observation unit, the speed controller, the neural network unit, the parameter compensation unit, and the parameter estimator.

7. The actuator control apparatus of claim 6, wherein the parameter estimator estimates the change of the load parameter using the third signal and the speed compensation information.

8. An actuator control apparatus comprising:
a speed observation unit configured to estimate a speed and a position of a load based on a first state equation including at least one modeled load parameter;
a torque observation unit configured to estimate a torque of the load based on a second state equation including the modeled load parameter;
a position controller configured to output a first signal for controlling the position of the load;
a neural network unit configured to determine an output of the torque observation unit and outputs a second signal that is to be added to the first signal;
a parameter compensation unit configured to receive a third signal obtained by adding the first signal to the second signal and compensate for the third signal, thus outputting a final control signal comprising:
a first compensator configured to increase or decrease the third signal;
a second compensator configured to increase or decrease position compensation information;
a third compensator configured to increase or decrease speed compensation information; and
an adder which adds an output of the second compensator to an output of the third compensator and adds a result of an addition to an output of the first compensator, thus outputting the final control signal; and
a parameter estimator which estimates a change of a load parameter, to decide a gain of the parameter compensation unit based on the estimated change of the load parameter, and to update the modeled load parameter of the speed observation unit and the torque observation unit based on the estimated change of the load parameter.

9. The actuator control apparatus of claim 8, wherein the speed observation unit outputs speed compensation information corresponding to the estimated speed of the load, and position compensation information corresponding to the estimated position of the load,
the speed compensation information is provided to the neural network unit, the parameter estimator, and the parameter compensation unit, and
the position compensation information is provided to the torque observation unit, the parameter estimator, and the parameter compensation unit.

10. The actuator control apparatus of claim 9, wherein the parameter estimator estimates the change of the load parameter using the third signal, the speed compensation information, and the position compensation information.

11. An actuator control apparatus comprising:
a speed observation unit configured to estimate a speed and a position of a load based on a first state equation including at least one modeled load parameter;
a torque observation unit configured to estimate a torque of the load based on a second state equation including the modeled load parameter;
a neural network unit configured to determine an output of the torque observation unit and to output a load torque compensation value that is to be added to a torque command;
a torque controller which receives a value obtained by adding the torque command to the load torque compensation value and outputs a signal for controlling the torque of the load;
a parameter compensation unit configured to compensate for the signal output from the torque controller and to output a final control signal comprising:

a first compensator configured to increase or decrease an output signal of the torque controller;

a second compensator configured to increase or decrease the position compensation information;

a third compensator configured to increase or decrease speed compensation information; and an adder which adds an output of the second compensator to an output of the third compensator and adds a result of an addition to an output of the first compensator, thus outputting the final control signal; and a parameter estimator configured to estimate a change of a load parameter, to decide a gain of the parameter compensation unit based on the estimated change of the modeled load parameter, and to update the modeled load parameter of the torque controller, the speed observation unit, and the torque observation unit based on the estimated change of the load parameter.

12. The actuator control apparatus of claim 11, wherein the speed observation unit outputs speed compensation information corresponding to the estimated speed of the load, and position compensation information corresponding to the estimated position of the load, the speed compensation information is provided to the neural network unit, the parameter estimator, and the parameter compensation unit, and the position compensation information is provided to the torque observation unit, the parameter estimator, and the parameter compensation unit.

13. The actuator control apparatus of claim 12, wherein the parameter estimator estimates the change of the modeled load parameter using the third signal, the speed compensation information, and the position compensation information.

14. An actuator control method comprising:

estimating a state of a load based on a state equation including at least one modeled load parameter;

outputting a control signal for controlling the load;

compensating for the control signal by increasing or decreasing an output signal of a controller using a first compensator; increasing or decreasing a position compensation information using a second compensator; increasing or decreasing speed compensation information using a third compensator; and adding an output of the second compensator to an output of the third compensator and adding a result of an addition to an output of the first compensator, thus outputting a final control signal; and estimating a change of a load parameter, deciding a degree of compensation of the control signal based on the estimated change of the load parameter, and updating the modeled load parameter based on the estimated change of the load parameter.

* * * * *